(12) United States Patent
Mistele

(10) Patent No.: US 12,406,250 B2
(45) Date of Patent: Sep. 2, 2025

(54) NON FUNGIBLE TOKEN (NFT) BASED LICENSING AND DIGITAL RIGHTS MANAGEMENT (DRM) FOR SOFTWARE AND OTHER DIGITAL ASSETS

(71) Applicant: Zelus Wallet, LLC, Dallas, TX (US)

(72) Inventor: Kyle Thomas Mistele, Dallas, TX (US)

(73) Assignee: Zelus Wallet, LLC, Dallas, TX (US)

( * ) Notice: Subject to any disclaimer, the term of this patent is extended or adjusted under 35 U.S.C. 154(b) by 276 days.

(21) Appl. No.: 18/105,232

(22) Filed: Feb. 2, 2023

(65) Prior Publication Data

US 2023/0245102 A1 Aug. 3, 2023

Related U.S. Application Data

(60) Provisional application No. 63/305,937, filed on Feb. 2, 2022.

(51) Int. Cl.
*G06Q 20/36* (2012.01)
*G06Q 20/12* (2012.01)
*G06Q 20/38* (2012.01)
*G06Q 20/40* (2012.01)

(52) U.S. Cl.
CPC ..... *G06Q 20/3672* (2013.01); *G06Q 20/1235* (2013.01); *G06Q 20/3821* (2013.01); *G06Q 20/3829* (2013.01); *G06Q 20/389* (2013.01); *G06Q 20/405* (2013.01)

(58) Field of Classification Search
CPC .............................................. G06Q 20/00–425
See application file for complete search history.

(56) References Cited

U.S. PATENT DOCUMENTS

| | | | |
|---|---|---|---|
| 11,075,891 B1 * | 7/2021 | Long | H04L 9/3213 |
| 2021/0192541 A1 * | 6/2021 | Black | G06Q 20/3829 |
| 2021/0359996 A1 | 11/2021 | Brown et al. | |

OTHER PUBLICATIONS

International Search Report and Written Opinion for PCT/US23/12241, mailed on Jun. 15, 2023, 7 pages.

* cited by examiner

*Primary Examiner* — Mohammad A. Nilforoush
(74) *Attorney, Agent, or Firm* — Brill Law Office; Jeffrey Brill

(57) ABSTRACT

NFTs are used to provide software licensing and DRM in a manner that is transferrable, allowing licensees to swap and resell licensed software according to terms specified by the licensor. NFTs are used to prove ownership of software and other digital assets on a blockchain. The blockchain provides a distributed public ledger that enables the tracking of ownership of the assets, without the use of a centralized server. Since software and other digital content licenses concern digital assets, they can be granted, tracked, and revoked on the blockchain via the use of NFTs. NFTs and the blockchain therefore provide a mechanism which is used to verify and authenticate software licenses, digital content licenses, and other types of licenses for digital assets. Smart contracts may be used to define and enforce the terms of the licenses, at any level of granularity.

20 Claims, 5 Drawing Sheets

NON FUNGIBLE TOKEN (NFT) BASED LICENSING AND DIGITAL RIGHTS MANAGEMENT (DRM) FOR SOFTWARE AND OTHER DIGITAL ASSETS

CROSS-REFERENCE TO RELATED APPLICATION

The present application claims the benefit under 35 U.S.C. § 119(e) of U.S. Provisional Patent Application Ser. No. 63/305,937, entitled "NFT-Based Licensing and Digital Rights Management for Software and Other Digital Assets," filed on Feb. 2, 2022, and having the same assignee, the entire contents of which are incorporated herein by reference.

TECHNICAL FIELD

This disclosure pertains generally to non-fungible tokens (NFTs), digital rights management (DRM) and blockchains, and more specifically to using NFTs to manage licensing and other digital rights for software and other digital assets.

BACKGROUND

Software licensing and DRM have historically presented various technical challenges for software developers and intellectual property holders. In the early years of personal computing, software and other digital media was commonly distributed on floppy disks, and then later CDs and DVDs. When an individual or organization obtained a piece of software or media, they purchased a physical medium containing the content. Legally, the content itself was not purchased but instead licensed for use. In practice, one could transfer the physical medium, re-sell it, or trade it, which had the actual effect of transferring the software, although generally did not legally transfer the ownership, and did not benefit the licensor.

Software and digital media are no longer commonly distributed on physical media. In many cases, they are downloaded from the internet, either from websites or from various "app stores" that are provided for various platforms (e.g., the Apple App Store, the Google Play Store, the Xbox Game Store, etc.). This change in digital media distribution mechanisms led to changes in how software was licensed. Instead of obtaining a disk or other physical medium that enables use of the software, the user now downloads the software, and typically must purchase a "license key" or other digital licensing technology to activate the software. This license key is generally non-transferrable, and is commonly locked to the device on which the software is installed. Licenses for software and other digital media are therefore non-transferrable in most cases, preventing the digital media from being resold, swapped, or transferred.

License keys are typically a long string of letters and numbers, which must be entered (either manually or automatically) into the purchased software for the software to function. When the key is entered into the licensed software, the software conducts what is known as a "license check." A license check usually involves contacting a license server hosted by the licensor, which contains a database of valid keys. The entered key is validated against the database to verify that the software is legitimately licensed. The license server will respond to the software conducting the license check and inform it whether the license is valid. If so, then the license check is passed, and the software will function as normal. If the license is not valid, then the license check fails, and the software will usually terminate or otherwise refuse to function until a valid license key is entered.

Another form of software licensing is web-based software. In this scenario, a user pays for access to an online, web-based service which is typically accessed through a web browser or other client-side software program. This is common for software that uses a subscription model (e.g., monthly charges) as opposed to a onetime payment for the license. (A onetime payment is more commonly used to license downloaded software, although a subscription based model can be used in this case as well.) When a user tries to login to the web service, the service determines if their license is still valid, i.e., if they have paid the subscription fee for the current period. If the license is still valid, then the user is logged in and is typically able to use the service as normal. If the license has expired, then the user may not be allowed to log in, or may be allowed to log in to a limited mode, in which the user is not able to utilize all the service's functionalities until they have paid to renew the license.

Digital Rights Management (DRM) technology has similarities to software licensing. A common scheme for DRM uses three components: the content (e.g., a game, movie, video, e-book, or similar other type of digital media), the player that plays the content, and the license server. When a user purchases a piece of DRM-protected content, the server allows the user to download an encrypted copy. When the user wants to utilize the content, the user launches the player. The player will automatically try to connect to the license server and request that the server validate the license that was received with the purchased content (this license may be bound to the user's specific device or account). The license server will then attempt to validate the license. If the license is valid, the license server will reply with the key to decrypt the encrypted DRM-protected content, the content is decrypted, and the user can utilize the content. If the license is invalid, no key is provided, and the content is not accessible to the user.

Current software licensing and DRM systems are known to have multiple issues that present certain weaknesses and/or inefficiencies. One significant issue with both software licensing and DRM approaches is that the systems are reliant upon a centralized license server to validate licenses. These systems cease to function if the license server experiences an outage, is taken down/decommissioned, or is otherwise unavailable. In the event that this were to happen, all users with licensed or DRM-protected content in the system that the license server belongs to would be unable to use their software or content.

License servers have failed or been discontinued in this way in the past, preventing users from accessing their content. Several notable instances of this include the discontinuation of MSN Music and Yahoo! Music. In these cases, users were unable to access the music they had purchased after support for the services was discontinued. Another example was the discontinuation of Adobe Content Server 3 for Adobe PDF. In this case, users were unable to access their media after the service was discontinued.

Another fundamental problem that is intrinsic to both approaches is that license keys and/or decryption keys must at some point be known to the licensee's computer system in order for them to use the content. Once this information reaches the licensee's system, the licensee can illicitly extract this information from the program and use it to "crack" the DRM protection or licensing.

Furthermore, licenses, once purchased, are typically non-transferable. Although this may be the licensor's goal, that is not always the case.

It would be desirable to address these issues.

SUMMARY

Non-Fungible Tokens (NFTs) are used to provide software licensing and digital rights management (DRM) in a manner that is transferrable, allowing licensees to swap and resell licensed software according to terms specified by the licensor, including the generation of a royalty stream for the licensor. NFTs are used to prove ownership of software and other digital assets on a blockchain. The blockchain provides a distributed public ledger that enables the tracking of ownership of the assets, without the use of a centralized server. Since software and other digital content licenses concern digital assets, they can be granted, tracked, and revoked on the blockchain via the use of NFTs. NFTs and the blockchain therefore provide a mechanism which is used to verify and authenticate software licenses, digital content licenses, and other types of licenses for digital assets. Thus, no centralized license server or license keys are required. Smart contracts may be used to define and enforce the terms of the licenses, at any level of granularity desired by the licensor.

The features and advantages described in this summary and in the following detailed description are not all-inclusive, and particularly, many additional features and advantages may be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

Figure 1:
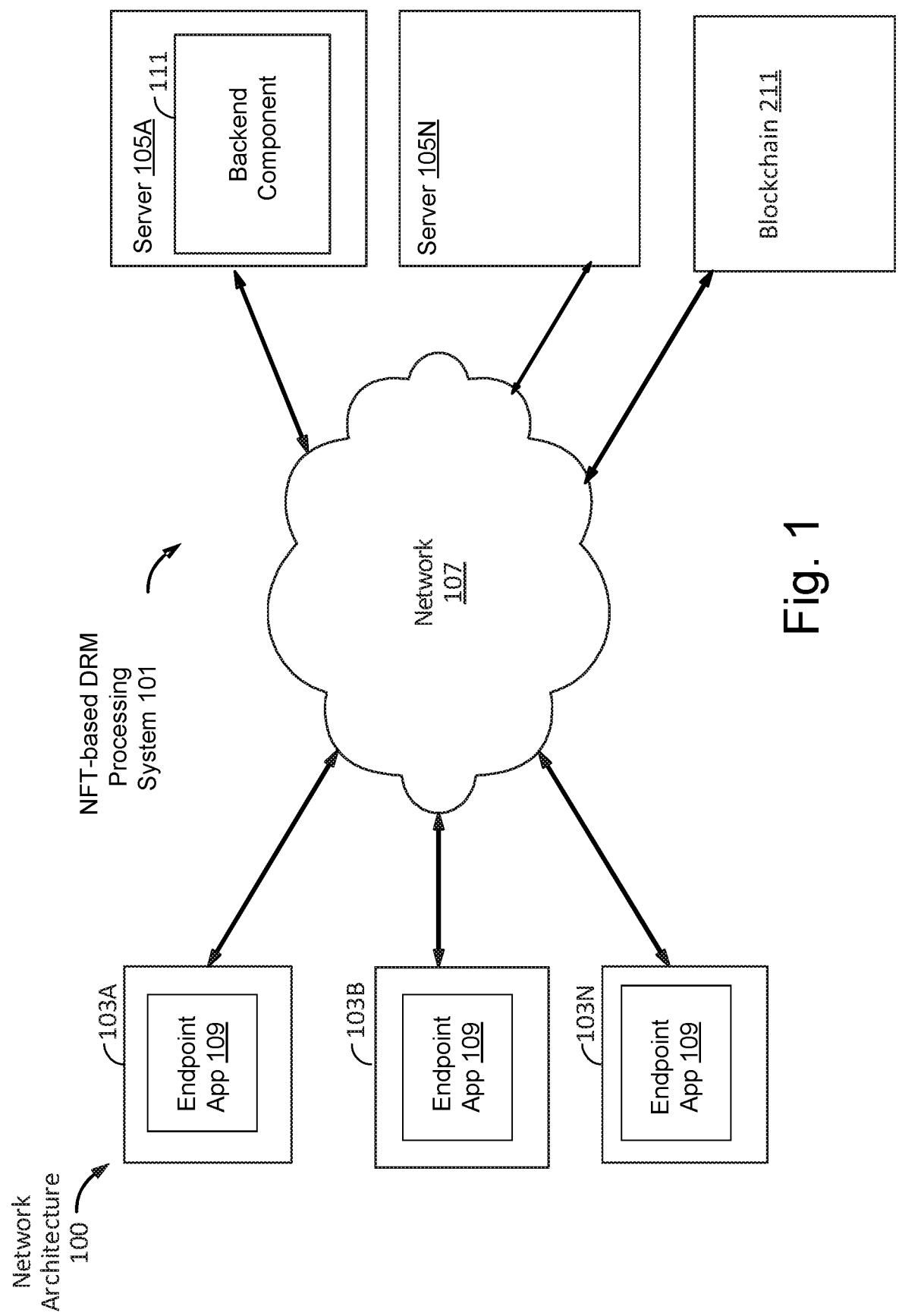
FIG. 1 illustrates a network environment in which an NFT-based DRM processing system can operate, according to some implementations.

The Figures depict various implementations for purposes of illustration only. One skilled in the art will readily recognize from the following discussion that other implementations of the structures and methods illustrated herein may be employed without departing from the principles described herein.

DETAILED DESCRIPTION

An NFT-based DRM processing system 101 enables licensors of software 207 or other digital assets to utilize Non Fungible Tokens (NFTs) and associated smart contracts on blockchains 211 as licenses for digital content. Using the NFT licenses 213, licensees (users 201) are able to license software 207 or other digital content without requiring the use of a centralized licensing server or license keys. The NFT licenses 213 may have customized terms at any level of granularity (e.g., the licenses may be transferrable, swappable, or resaleable, etc.) as specified by licensor-set terms in the smart contracts.

FIG. 1 is a high-level block diagram illustrating an exemplary network architecture 100 in which an NFT-based DRM processing system 101 can be implemented. Referring to FIG. 1, the illustrated network architecture 100 comprises multiple endpoint computer systems 103A, 103B, and 103N (together may be referred to as "endpoint 103") as well as multiple backend computer systems 105A, 105B, and 105N (together may be referred to as "backend 105"). In FIG. 1, a backend component 111 of the NFT-based DRM processing system 101 is illustrated as residing on backend computer system 105A, with an endpoint app 109 running on each endpoint computing system 103A-C. An endpoint app 109 is an endpoint level component of the NFT-based DRM processing system 101. The endpoints 103 represent computer systems operated by licensees, and the backend 105 represents one or more computing systems utilized by one or more licensors. It is to be understood that FIG. 1 illustrates an example only. In various implementations, various functionalities of the NFT-based DRM processing system 101 can be instantiated on a backend computer system 105, an endpoint computer system 103, or can be distributed among multiple backend computer systems 105 and/or endpoint computer systems 103. FIG. 1 also illustrates a blockchain 211, which is described in more detail below.

The endpoint computer systems 103 can be in the form of computing devices operated by users. A user of an endpoint computing device 103 can interact with an endpoint app 109 residing on the specific endpoint device 103 to license and interact with digital content as discussed in greater detail below. An endpoint app 109 can communicate with the backend component 111, without the user being aware of the underlying functionality being performed transparently by the NFT-based DRM processing system 101.

Endpoint computer systems 103 and backend computer systems 105 can be implemented using computer systems 610 such as the one illustrated in FIG. 5 and described below. The endpoint computer systems 103 and backend computer systems 105 are communicatively coupled to a network 107, for example via a network interface 248 as described below in conjunction with FIG. 5. Endpoint computer systems 103 are able to access applications and/or data on backend computer systems 105 using, for example, a web browser or other endpoint computer system software such as an endpoint app 109. Endpoint computer systems 103 may be in the form of laptops, desktops and/or other types of computers/computing devices, including mobile computing devices, comprising portable computer systems capable of connecting to a network 107 and running applications (e.g., smartphones, tablet computers, wearable computing devices, etc.). Backend computer systems 105 can be in the form of, e.g., rack-mounted computing devices, located, e.g., in data centers.

Although FIG. 1 illustrates three endpoint computer systems 103A-C and two backend computer systems 105A-N as an example, in practice many more (or fewer) endpoint computer systems 103 and/or backend computer systems 105 can be deployed. In one implementation, the network 107 is in the form of the internet. Other networks 107 or network-based environments can be used in other implementations.

Figure 2:
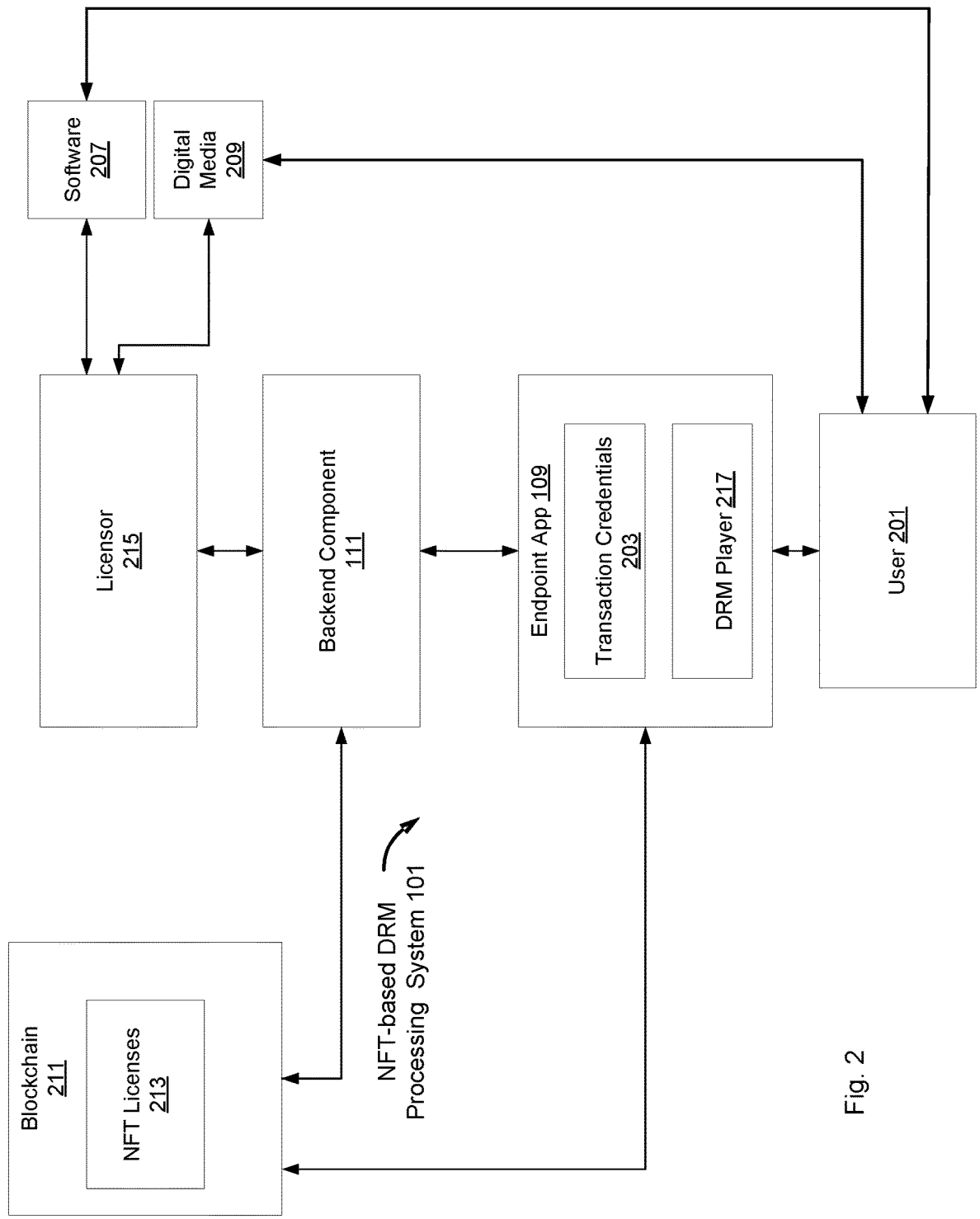
FIG. 2 illustrates the operation of an NFT-based DRM processing system, according to some implementations.

FIG. 2 illustrates the operation of an NFT-based DRM processing system 101 according to some implementations. As described above, the functionalities of the NFT-based DRM processing system 101 can reside on a backend computer system 105 or other specific computer 610, or be otherwise distributed between multiple computer systems 610, including within a cloud-based computing environment in which the functionality of the NFT-based DRM processing system 101 is provided as a cloud-based service over a network 107. It is to be understood that although the NFT-based DRM processing system 101 is illustrated in FIG. 2 as comprising a backend component 111 and an endpoint app 109, each of which is illustrated as a single entity, the NFT-based DRM processing system 101 represents a collection of functionalities, which can be instantiated as a single or as multiple modules, as desired. In some implementations, the different modules of the NFT-based DRM processing system 101 can reside on different computing devices 610 as desired. The backend component 111 can be implemented as one or more applications configured to run on the backend computer system 105. Each endpoint app 109 can be instantiated as an application configured to run under an operating system such as Windows, OS X, Linux, etc., or as an app for a given mobile operating system (e.g., Android, iOS, Windows 11, etc.), with different endpoint apps 109 being specifically implemented for different types of operating environments utilized by different end users.

It is to be understood that the components and modules of the NFT-based DRM processing system 101 can be instantiated (for example as object code or executable images) within the system memory 617 (e.g., RAM, ROM, flash memory) of any computer system 610, such that when the processor 614 of the computer system 610 processes a module, the computer system 610 executes the associated functionality. As used herein, the terms "computer system," "computer," "backend computer system," "endpoint computer system," "client," "client computer," "server," "server computer" and "computing device" mean one or more computers configured and/or programmed to execute the described functionality. Additionally, program code to implement the functionalities of the NFT-based DRM processing system 101 can be stored on computer-readable storage media. Any form of tangible computer-readable storage medium can be used in this context, such as magnetic, optical, flash and/or solid-state storage media, or any other type of media. As used herein, the term "computer-readable storage medium" does not mean an electrical signal separate from an underlying physical medium.

As illustrated in FIG. 2, the NFT-based DRM processing system 101 automatically executes transactions across the blockchain 113. The backend component 111 of the NFT-based DRM processing system 101 can reside on a backend computer system 105, and an endpoint app 109 can reside on an endpoint computing system 103. A specific user 201 can interact with the endpoint app 109 on, e.g., the endpoint computing system 103 in order to license specific digital content (e.g., software 207 or digital media 209) as described herein.

Users 201 who utilize blockchain transactions to license software or other digital assets have blockchain transaction credentials 203 and cryptocurrency specific to a given blockchain 113. For example, in the use case example of the Ethereum blockchain, a user 201 could use ETH (Ethereum tokens) to use an NFT license 213 on Ethereum blockchain to license a specific piece of software 207 according to terms of an associated smart contract. It is to be understood that Ethereum is just example of a blockchain 211. Other blockchains 211 can be used in different implementations, for example Solana, Tezos, or any other suitable blockchain 211. Blockchain transaction credentials 203 comprise at least a unique public/private key pair configured for transacting on a specific blockchain. Blockchain transaction credentials 203 can be in the form of a cryptocurrency wallet for a specific blockchain. It is to be understood that a cryptocurrency wallet is a software program, device or physical medium which stores a public/private key pair used for cryptocurrency transactions. In addition to storing the keys, a cryptocurrency wallet may offer additional functionality such as encrypting and/or signing transactions such as smart contracts using the private key. Various technologies can be used to store the values of the public and private keys, or a seed value for generating the keys, such as a software wallet running on a computer, a wallet hosted on an exchange where cryptocurrency is traded, wallet information on a digital medium, a dedicated hardware wallet, etc. In some implementations, a user's endpoint app 109 implements and manages wallet functionality for that user.

The user 201 of the endpoint app 109 illustrated in FIG. 2 can engage in blockchain based licensing transactions by interacting with the interface of the endpoint app 109. It is to be understood that a blockchain is a growing list of data records, known as blocks, which are linked together using cryptography. Each block contains a cryptographic hash of the previous block, and may contain a timestamp and transaction data. The timestamp proves that the transaction data existed when the block was added to the blockchain. As blocks in the chain each contain a cryptographic hash of the previous block, a blockchain is resistant to modification, because no block can be modified after it is added to the chain without altering all subsequent blocks. The nature of this cryptographic linking of the blocks provides a high level of security, especially if there are a large number of blocks.

A blockchain is distributed across a peer-to-peer network. Blockchains are managed by their corresponding peer-to-peer network, where nodes on the network collectively adhere to a given protocol to communicate and validate new blocks. A consensus algorithm is used that allows the participating nodes to agree on information included within each new block. Using the consensus algorithm, the blockchain is replicated and maintains the same state across the network of participants, allowing the blockchain to function as a secure, decentralized, append-only ledger. Examples of consensus algorithms that can be used in this capacity include proof-of-work, proof-of-stake, proof-of-activity, proof-of-burn, proof-of-capacity, or proof-of-elapsed time. Different blockchains utilize different formats, protocols, networks, etc. Some examples of blockchains include, Ethereum, FLOW, Tezos, etc. As stated above, different blockchains may be used in conjunction with different implementations of the NFT-based DRM processing system 101 as desired.

A blockchain can be used as a ledger for transactions using a specific corresponding digital currency, with the blocks documenting one or more transactions that involve the transfer of the corresponding currency from one party to another. In some implementations, the currency is created as a reward for a process called mining, which is successful use of the consensus protocol to solve a computational problem and thereby validate a new block that is added to the chain. This is known as a proof of work consensus protocol. In other implementations, different proof of consensus protocols are used, such as proof of stake in which nodes compete to append blocks and earn associated rewards in proportion to stake, or existing cryptocurrency allocated and locked or staked for some time period. Other consensus protocols include proof of authority, proof of space, proof of burn, or proof of elapsed time. Different consensus protocols may be used in conjunction with different implementations of the NFT-based DRM processing system 101 as desired.

Digital currency is registered to a specific address (typically derived from a public key). Once created and awarded to a miner (or other party as appropriate in implementations using different consensus protocols), the currency can be transferred to another party, using the public key of the receiving party as an address and the private key of the transferring party to sign the transaction. Owners of units of digital currency can subsequently use it in further transactions. Each transaction is broadcast to the peer-to-peer network, and once validated it is added to a new block in the chain, created through the process of mining (or other method) using the consensus protocol. Blockchains prevent double spending, for example by maintaining a ledger in which transfers are treated as shifts of value between accounts (for blockchains that use an Account system such as Ethereum), or requiring that each transfer refers to a previous unspent receipt of the currency in the blockchain (for blockchains that use a UTXO model such as Bitcoin or Litecoin), etc.

One type of blockchain transaction is the purchase of a non-fungible token (NFT) using cryptocurrency. An NFT is a unit of data stored on a blockchain that certifies the unit of data to be unique and, therefore, not interchangeable. An NFT can be associated with a particular digital or physical asset (such as a file or a physical object), and a license to use the asset for a specified purpose. An NFT does not contain the underlying digital asset itself, but rather contains data that ties it to the asset. This data may be called the metadata. An example of metadata for an NFT would be a URL of the digital image to which the NFT grants rights. NFTs can be traded and sold on digital markets as blockchain transactions. Being a unit of data on a blockchain, an NFT may be sold and traded.

Unlike cryptocurrencies, NFTs are not mutually interchangeable, hence are not fungible. While all bitcoins or ETH are equal, each NFT is unique, represents a different underlying asset, and thus may have a completely different value from other NFTs.

When an NFT is created and added to a blockchain record, the process may be referred to as minting the NFT. An associated smart contract may be in the form of a computer program or transaction protocol which may automatically execute, control or document legally relevant events and actions according to the terms of a contract or an agreement. A smart contract (the "mint") may be created and placed on the blockchain. This contract may define the token type, structure, and in some cases code and data, and individuals can use the smart contract's functions to purchase the NFT (or multiple NFTs) defined by the contract, to transact them with other parties, and so forth. Different blockchains use different standards and formats for representing NFTs and smart contracts. For example, a smart contract may be in the form of a program which is stored on and executed by the blockchain. The NFT associated smart contract may define the token type, structure, and data/metadata of the NFT. The smart contract may be deployed to (stored on) the blockchain, and then users interact with the smart contract over the blockchain to use a mint function contained by the contract to create a new instance of an NFT in the collection defined by the contract. This mint function may be restricted so that only the creator of the smart contract can invoke it (thus creating a new NFT in the collection), or it may be unrestricted in which case any party may invoke this function. When a user wishes to purchase or license an NFT, they invoke the functions on the associated contract that handle NFT purchases and transactions, and they pay two fees: 1) they pay a transaction fee, called a gas fee, to the blockchain node that is executing the transaction; and 2) they pay the cost of the purchase price/license fee of the NFT to the smart contract's account.

NFT associated smart contracts (for example, those according to the ERC-721 or ERC-1155 standards) may be used herein to define terms for licensing a class of digital assets (e.g., software 207 or digital media 209) that can be licensed, transferred, and even revoked in a way determined by the licensor (the creator of the smart contract). Because NFT transactions are recorded on the blockchain, it is possible for any individual or system with internet access to prove whether an individual with a given crypto wallet has a license associated with a given NFT. In this way, an NFT presents an unimpeachable claim to a license that cannot be counterfeited or copied, and can only be operated on in ways that the smart contract defines. These properties of NFTs make them ideal for software and digital asset licensing.

Figure 3:
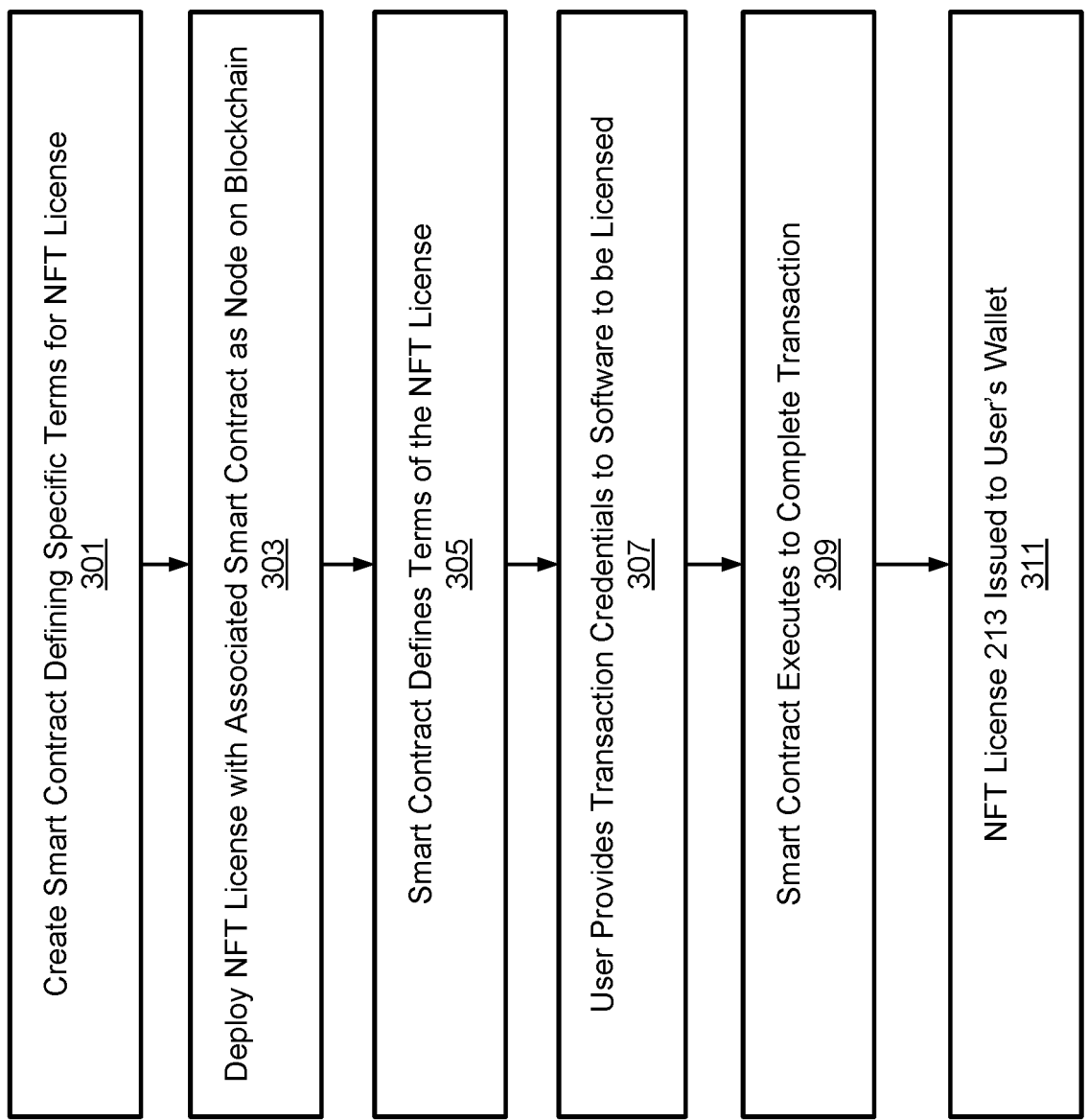
FIG. 3 illustrates steps of the operation of an NFT-based DRM processing system, according to some implementations.

Turning now to FIG. 3, licensors 215 of software 207 (or other digital content) may create 301 smart contracts defining specific terms for NFT licenses 213 at any desired level of granularity. When a licensor 215 wishes to offer license(s) for a piece of software 207, the licensor may deploy 303 an NFT license 213 with an associated smart contract on the blockchain 211. FIG. 2 illustrates a licensor 215 utilizing the backend component of the NFT-based DRM processing system 101 to deploy an NFT license 213. It is to be understood that this is just an example implementation, and the licensor may use any computer system 610 to deploy NFT licenses 213 as desired. In some implementations, multiple licensors use the same computer system to deploy NFT licenses 213, whereas in other implementations each licensor uses its own computer system 610 for this purpose.

The smart contract defines 305 (and when executed enforces 309) the terms of the NFT license 213, which can be specified by the licensor as desired. For example, smart contracts associated with NFT licenses 213 may define terms such as what data specific licenses 213 contain; the cost for given NFT licenses 213; the payment structure for specific NFT licenses 213 (e.g., whether there is a one-time fee, or scheduled fee payments on a recurring basis); if, how and under what circumstances given NFT licenses 213 may be transferred by licensors and/or licensees, resold or swapped by licensees, revoked by licensors, etc.; how many NFT licenses 213 can be issued for a given digital asset; the duration of specific NFT licenses 213, etc. It is to be understood that these are just examples of NFT license terms that may be specified by smart contracts. Other terms may be specified in other implementations as desired. Any number of additional and/or different terms may be placed on NFT licenses 213, as long as they are capable of being expressed in a smart contract.

Responsive to the user 201 attempting to license a piece of software, the user's blockchain transaction credentials (crypto wallet address, public key and a cryptographic signature generated using their private key) are provided to the software to be licensed. In other words, the user may operate the software and request a license, which connects the user's wallet to the piece of software. Concerning the transaction credentials, the wallet address can be derived from the public key deterministically, which proves that the holder of the public key owns the address. The cryptographic signature generated from the private key proves that the user owns the key pair, and therefore the address, without disclosing the private key to the software 307. The cryptographic signature can be a signature of a randomly-generated challenge generated by the application to prevent "replay" attacks, in which a user utilizes a signature generated by another user's private key to claim ownership of the other user's private key.

The piece of software 307 then triggers the execution 309 of the associated smart contract as described in more detail below. After the process is successfully completed, the NFT license 213 is issued 311 to the user's wallet by execution of the license smart contract. If the user does not already have an NFT license for the software in their wallet, a transaction is executed to purchase a license from the smart contract. If the user already has such an license NFT in their wallet, the software can either call the smart contract to determine if the user has a valid license (this is fee-less, but does not result in a change of state on the blockchain) or submit a transaction that results in a state change in the smart contract. This incurs a fee, but provides an additional degree of verification at the blockchain level.

The NFT has a unique identifier, and may be associated with additional metadata about the license terms, for example, a link to a text version of the license, the license term/duration, and so forth. Any user with an internet connection can prove beyond a doubt whether a given individual actually holds the license. Note that there is no requirement for a license server to issue the license, since the blockchain 211, which is distributed rather than centralized, is providing this functionality. Because smart contracts are immutable and permanent on the blockchain once deployed, there is no need to pay for or maintain a licensing server, although there is a one-time cost to deploy a smart contract, generally. Because the smart contract is on the blockchain, the license does not need to be maintained, and it cannot be "taken down" (unless the smart contract which defines the license terms allows it to be "taken down," e.g., license revocation for users who violate terms of service). It will always be available on the blockchain 211 so long as the blockchain 211 remains active.

Figure 4:
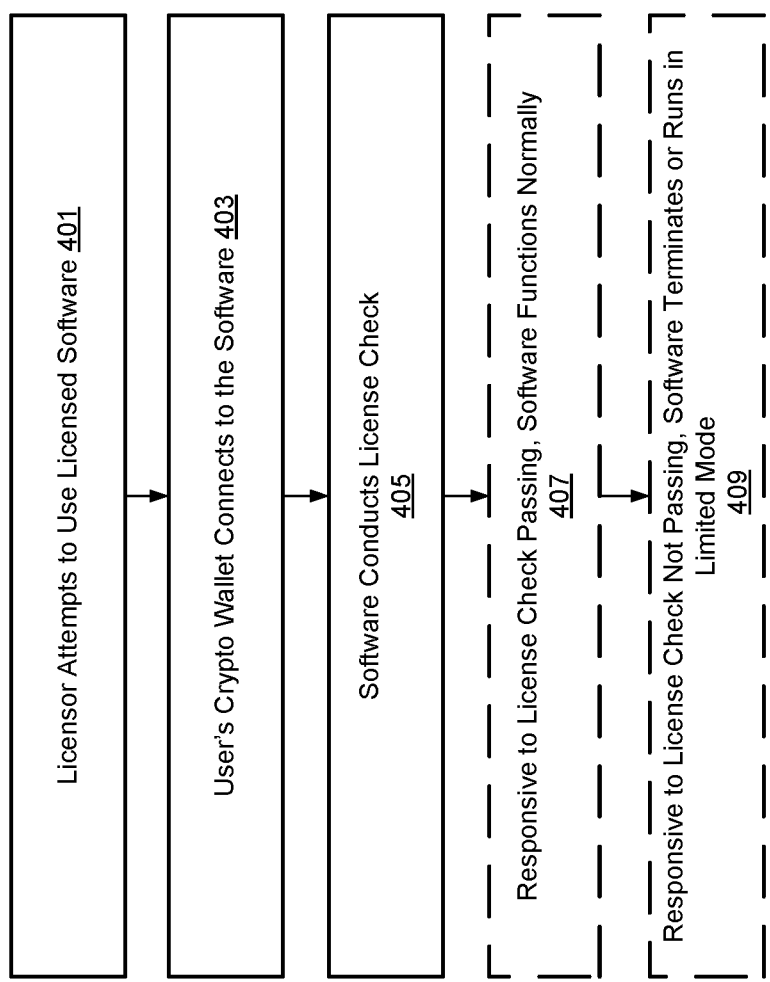
FIG. 4 illustrates steps of the operation of an NFT-based DRM processing system, according to other implementations.

Turning now to FIG. 4, the workflow for utilizing an issued NFT license 213 is illustrated and described. When a licensor (a user 201) attempts 401 to use the licensed software (or other digital content), the user's wallet is used to verify the license. More specifically, when a user 201 with an NFT license 213 for a piece of software 207 attempts to use the piece of software, the user's wallet is connected 403 to the piece of software or digital content. The piece of software 307 then conducts 405 a license check, calling the NFT license smart contract, and determines whether the claimed licensee does in fact have a license for the given piece of software. If a license has been granted to the claimed licensee, then the license check passes, and the software functions 407 normally. If the license check fails, then the software or media remains 409 in an unusable or restricted state until a wallet with a valid license NFT is connected and its license is verified.

Similar to the workflow for access, responsive to the user 201 attempting to transfer the digital asset. The user's wallet connects to the software which calls the smart contract, which enforces the specified terms of transfer. As noted above, because the NFT license associated smart contract can define allowed patterns for transferring the NFT license, the licensor may elect to enable license transfers, resales, or swaps between licensees. The licensor can govern how these transfers take place (if they are allowed) through the smart contract. For example, the smart contract may allow licensees to sell their license to another individual who will become the new licensee. However, the licensor that owns the smart contract can determine rules for this type of transaction. The licensor could, for example, set floor and/or ceiling prices for the license resales, or they could require that a royalty be paid to the licensor each time a license is resold. There are a wide range of possibilities on how the licensor could choose to allow or restrict these transactions.

Similarly, the licensor could enable or disable swaps of licenses between licensees. For example, suppose a licensee "Alice" has a license to some digital asset "X," and another licensee "Bob" has a license to some digital asset "Y." The licensor could provide capabilities that would allow Alice and Bob to swap licenses for their respective assets, in a way determined by the licensor(s). In addition, the licensor could enable or disable transfers of licenses between licensees, e.g., transfers as distinguished from resales, where in a resale the original licensee is paid by the new licensee for the license, and in a transfer the original licensee does not receive a payment from the new license. However, the licensor could still optionally require that a royalty payment of some type be made to him for the transfer to take place. In other words, the NFT license smart contract can, at the licensor's discretion, allow licenses to be bought, sold, and/or transferred on a marketplace in a peer-to-peer way that conventional software licensing schemes do not allow, while still ensuring that all of these transactions take place in line with requirements that the licensor has implemented in smart contract. This enables peer-to-peer exchange in a powerful new way, while still enabling licensors to have control over their intellectual property.

When a licensee attempts a transfer operation and actives the smart contract through their wallet as described above, the smart contract executes and can enforce whatever transfer restrictions in a place in a manner that a conventional contract cannot. For example, while a conventional contract may legally prohibit licensees from sharing license keys with another user in a contractual manner, a smart contract can actually technically prevent a holder of an NFT license from being shared or transferred to another user, unless and except as specially authorized by the licensor.

As noted above, existing software licensing and DRM schemes have multiple shortcomings, inefficiencies, and weaknesses. NFT-based licensing according to the NFT-based DRM processing system 101 solves many of these issues. First, as noted above, there is no longer a need for a license server. The smart contract authorizes and validates the terms of the license, and it is permanently deployed on the blockchain. It cannot be lost, taken down, or otherwise destroyed. Therefore, there is not the possibility that licensees may lose the ability to use their licensed assets in the same way that there is when license servers for traditionally licensed software go dark. This protects the licensee's rights.

In addition, the blockchain provides a public, unimpeachable ledger that in this use case allows anybody to prove if a given individual owns a license that they claim to own. The licenses are tracked by the blockchain, and cannot be fabricated, counterfeited, or copied in a meaningful way that would allow the scheme to be bypassed in the described ways.

By enabling the licensors to specify and enforce license terms via the smart contracts, licensors may grant, revoke, and transfer licenses to licensees without the need to host a server that tracks and validates licenses. Thus, licensees are able to transfer, swap, and sell licenses, but only under conditions or requirements put in place by the licensor through the smart contract that defines the NFT license 213. For example, a licensor may allow license resale and transfer, but the smart contract could be written such that the licensor gets a royalty fee every time the NFT license 213 is resold or transferred. Similarly, licensors could, through the NFT license associated smart contract, impose a floor or ceiling price on license resales to prevent price gouging or depreciation. Many other such conditions or terms are possible, so long as they can be programmed into a smart contract. For example, a licensor may determine who holds a current license and to view a history of individuals/ organization who have held that particular license in the past. A licensor may also to provide additional content or capabilities to licensees after the fact of the license being granted, as well as revoke an existing NFT license 213. Because smart contracts associated with NFT licenses 213 can govern what types of transactions involving licenses are allowed, a licensor may effectively create a peer-to-peer marketplace for software and digital assets, by enabling licensees to buy, sell, and resell NFT licenses 213. This could look similar to conventional NFT marketplaces, with the improvement that transactions may be controlled based on smart contract terms as desired.

The use of the NFT-based DRM processing system 101 is primarily described above in conjunction with software licenses. The use of the NFT-based DRM processing system in the context of smart contracts for DRM applications is now discussed in greater detail in conjunction with a specific example. For the purposes of this example, an licensee "Alice" is described who wishes to purchase a DRM-protected asset such as a video file containing a movie ("the asset" or "the content") from a licensor Bob, who is offering the license. Returning our attention to FIG. 2, the following components are involved in the example transaction: Alice's transaction credentials 203 (crypto wallet); Bob's DRM license 213 for the content, including an associated smart contract; DRM license verification functionality in the backend component 111 usable by Bob, and a DRM player 217 downloaded on Alice's computer system (illustrated as part of the endpoint app 109 in FIG. 2, but optionally configurable separately therefore). Note that this describes components utilized in the example transaction, but additional and/or different features used in different implementations, for example for enhanced functionality or security.

When Bob decides to protect his digital asset with NFT-based DRM, he creates and deploys a smart contract that defines the terms of the corresponding NFT license 213, similar to the process described in more detail for software licenses. In our example, this smart contract defines the terms and conditions of the licenses, the cost of a license, how long the license is valid for, which assets the license is valid for, and the fee structure for the purposes of DRM. Optionally, the smart contract may include terms to enable functionalities for re-selling, swapping, and transferring, or these terms may be omitted if desired.

When Alice, the licensee, wishes to acquire the license to Bob's asset, she uses the NFT-based DRM processing system 101 to purchase an NFT license 213. The cost is defined by Bob, the licensor, in the smart contract. Alice pays the cost according to the payment structure the smart contract defines. Once she has paid the purchase fee to the smart contract, the smart contract issues Allice an NFT license that grants her permission to use the licensed asset as per the terms. The terms of the contract may specify that the license expires after a set amount of time, in which case the contract can burn the NFT, effectively revoking the license.

Once Alice has purchased an NFT license, she can launch her DRM player and attempt to access the DRM-protected asset. To do this, she connects the crypto wallet she used to purchase the license to the player, which ensures that she cryptographically signs her wallet's public key and address with her wallet's private key. Her wallet's public key, address, and the cryptographic signature may be sent to the backend point for license verification.

The backend component verifies that the cryptographic signature is valid, and that it matches her provided public key and address. This proves that Alice owns the crypto wallet identified by the address she provided. Then, the endpoint component calls the smart contract and verifies that a crypto wallet with the provided address has purchased a valid license. This may be called the license check stage analogous to the scheme described above. If the license check passes, the backend component takes the original copy of the asset, generates an encryption key "K" with a symmetric-key encryption scheme such as AES, and create an encrypted copy of the asset using K. Note that this key should be generated randomly, and should never be re-used. Each request to the backend component should result in a new key K being created and used for the encryption process.

Then, the backend component encrypts K using the public key which Alice provided in the request, creating $K_E$, and then it replies to her request with $K_E$ and the content encrypted with K. Because the symmetric key is encrypted with Alice's public key, only the holder of Alice's private key, namely Alice, can decrypt the symmetric key. Once Alice receives the response in her DRM player, the player can decrypt $K_E$ using her private key to obtain K, which it can then use to decrypt the requested asset and play it.

Note that this implementation uses Alice's wallet's private-public key pair for authentication and for securely transporting the symmetric key, but it uses the symmetric-key encryption scheme for encrypting and decrypting the requested asset. This is because symmetric key encryption and decryption is orders of magnitude faster and more efficient than encryption and decryption with a private-public key pair, although public key encryption could still be used in other implementations.

The DRM player may periodically re-authenticate with the backend component using the same keys and cryptographic scheme described above. If authentication fails, or the license is found to be expired, the DRM-protected content may be removed from Alice's device (and/or access to updates or web-connected content may be prevented, etc.) If the DRM player is unable to contact the backend component for longer than some fixed amount of time (e.g., if Alice's device is offline for an extended period of time), the content may be deleted until contact with the backend component can be re-established.

One benefit of this approach is that the decryption key used to decrypt the requested asset cannot be distributed—it is unique to Alice. Each time the asset is downloaded by an individual, it is encrypted with a unique key. Keys therefore cannot be re-used by different individuals. This scheme also allows for easy license validation and revocation—it is impossible to counterfeit a license since licenses are tracked on the blockchain, and it is impossible to transfer them or use them in a way that the smart contract does not allow. Licenses can be easily revoked by burning the license NFT.

One feature that could be implemented to enhance the protections provided by the scheme would be to download the content from the server in two parts: a short header that contains metadata and other information required to play the content, and then the actual content. After the content is played each time, the header is deleted by the DRM player and is subsequently re-downloaded from the backend component—this would facilitate re-authentication to ensure that the license is still valid and to further help prevent illegal redistribution. However, for this to be efficient, the header should be small to prevent long download times. Examples include allowing the sale and resale of digital copies of video games, and temporarily licensing out digital assets, e.g., music, on a temporary or fixed-term basis.

While Non-Fungible Tokens provide an excellent mechanism to manage licenses for digital assets, in some implementations other forms of blockchain tokens are used, instead or in combination. There are also potential benefits to using Fungible or Semi-Fungible tokens for the same purpose in other implementations. Some of these implementations are now described. One benefit of using Non-Fungible Tokens for licensing is that each token has a unique identifier, and can have unique license terms, unique metadata, and unique properties. This enables the licensor to have more control in how licenses are granted to licensees. However, a drawback of using non-fungible tokens is that non-fungible token smart contracts tend to be expensive to create and manage due to gas fees. Using fungible or semi-fungible tokens presents a significantly more gas-efficient way to manage digital rights and licenses than non-fungible tokens do. However, there are some issues to be aware of with this approach: each fungible license token is identical to every single other license token, and therefore, it is not possible to include custom properties, metadata, or terms to fungible tokens. Thus, it is not possible to create differentiated licenses using fungible token, except by creating multiple classes of fungible license tokens, each of which implies some differentiation in license terms. While one can track point-in-time balances, it is significantly harder to track the history of license transfers from one licensee to another. In some implementations, a mixed NFT and fungible license structure is used, such that users pay more for NFT licenses with greater functionality (transferability, etc.) and less for temporary or simpler licenses that are managed with fungible tokens.

Figure 5:
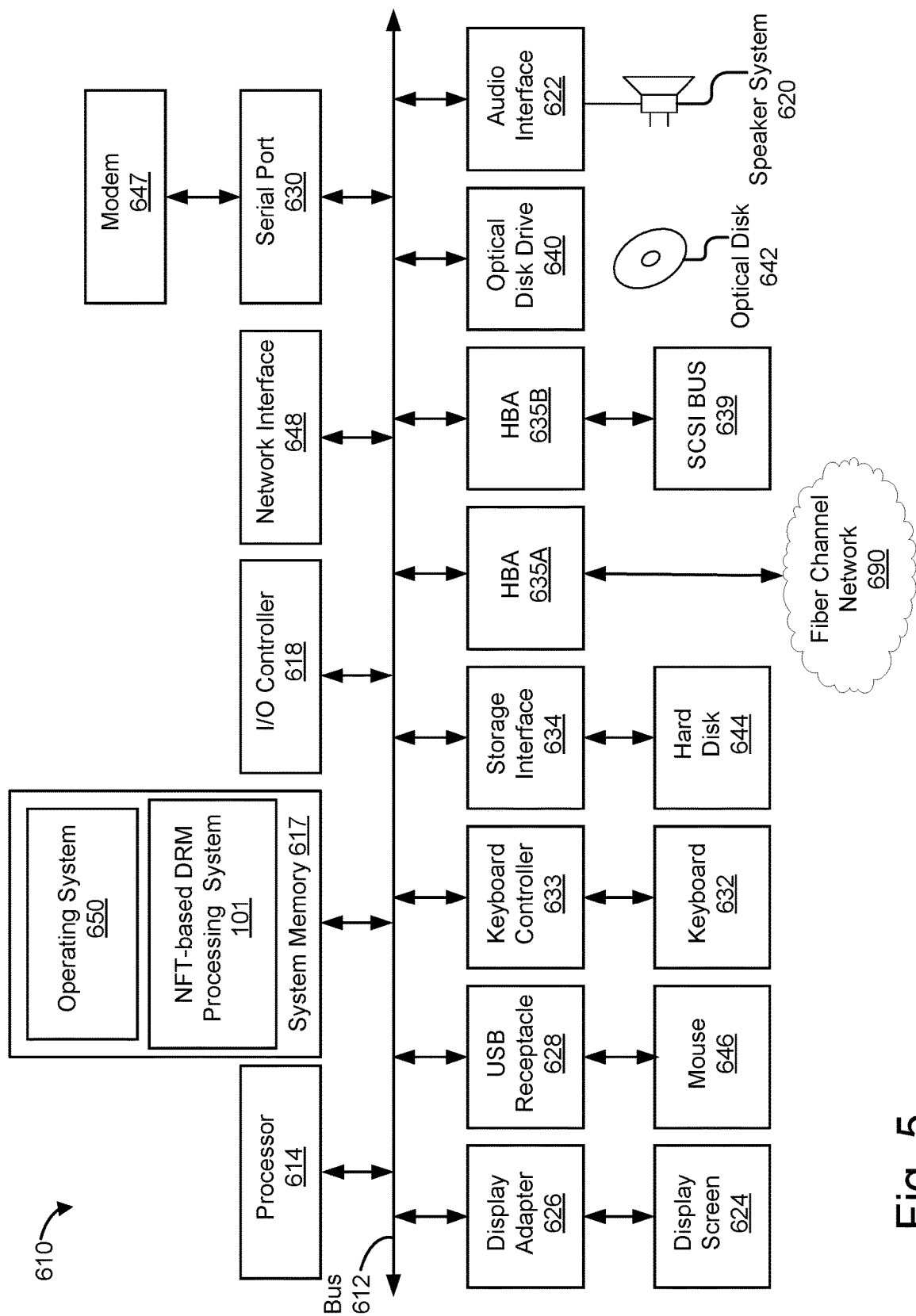
FIG. 5 illustrates a computer system suitable for implementing an NFT-based DRM processing system, according to some implementations.

FIG. 5 is a block diagram of an example computer system 610 suitable for implementing an NFT-based DRM processing system 101. Both endpoint computer systems 103 and backend computer systems 105 can be implemented in the form of such computer systems 610. As illustrated, one component of the computer system 610 is a bus 612. The bus 612 communicatively couples other components of the computer system 610, such as at least one processor 614, system memory 617 (e.g., random access memory (RAM), read-only memory (ROM), flash memory), an input/output (I/O) controller 618, an audio output interface 622 communicatively coupled to an audio output device such as a speaker 620, a display adapter 626 communicatively coupled to a video output device such as a display screen 624, one or more interfaces such as Universal Serial Bus (USB) receptacles 628, serial ports 630, parallel ports (not illustrated), etc., a keyboard controller 633 communicatively coupled to a keyboard 632, a storage interface 634 communicatively coupled to one or more hard disk(s) 644 (or other form(s) of storage media), a host bus adapter (HBA) interface card 635A configured to connect with a Fibre Channel (FC) network 690, an HBA interface card 635B configured to connect to a SCSI bus 639, an optical disk drive 640 configured to receive an optical disk 642, a mouse 646 (or other pointing device) coupled to the bus 612, e.g., via a USB receptacle 628, a modem 647 coupled to bus 612, e.g., via a serial port 630, and one or more wired and/or wireless network interface(s) 648 coupled, e.g., directly to bus 612.

Other components (not illustrated) may be connected in a similar manner (e.g., document scanners, digital cameras, printers, etc.). Conversely, all the components illustrated in FIG. 5 need not be present (e.g., smartphones and tablets typically do not have optical disk drives 640, external keyboards 632 or external pointing devices 646, although various external components can be coupled to mobile computing devices via, e.g., USB receptacles 628). The various components can be interconnected in different ways from that shown in FIG. 5.

The bus 612 allows data communication between the processor 614 and system memory 617, which, as noted above may include ROM and/or flash memory as well as RAM. The RAM is typically the main memory into which the operating system 650 and application programs are loaded. The ROM and/or flash memory can contain, among other code, the Basic Input-Output system (BIOS) which controls certain basic hardware operations. Application programs can be stored on a local computer readable medium (e.g., hard disk 644, optical disk 642) and loaded into system memory 617 and executed by the processor 614. Application programs can also be loaded into system memory 617 from a remote location (i.e., a remotely located computer system 610), for example via the network interface 648 or modem 647. In FIG. 5, the NFT-based DRM processing system 101 is illustrated as residing in system memory 617.

The storage interface 634 is coupled to one or more hard disks 644 (and/or other standard storage media). The hard disk(s) 644 may be a part of computer system 610 or may be physically separate and accessed through other interface systems.

The network interface 648 and/or modem 647 can be directly or indirectly communicatively coupled to a network 107 such as the internet. Such coupling can be wired or wireless.

As will be understood by those familiar with the art, the subject matter described herein may be embodied in other specific forms without departing from the spirit or integral characteristics thereof. Likewise, the particular naming and division of the portions, modules, agents, managers, components, functions, procedures, actions, layers, features, attributes, methodologies, data structures and other aspects are not mandatory or significant, and the entities used that implement the subject matter described herein may have different names, divisions and/or formats. The foregoing description, for purpose of explanation, has been described with reference to specific implementations. However, the illustrative discussions above are not intended to be exhaustive or limiting to the precise forms disclosed. Many modifications and variations are possible in view of the above teachings. The implementations were chosen and described in order to best explain relevant principles and their practical applications, to thereby enable others skilled in the art to best utilize various implementations with or without various modifications as may be suited to the particular use contemplated.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, bytes, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic device, that manipulates and transforms data represented as physical (electronic) quantities within the computer system's registers and memories into other data similarly represented as physical quantities within the computer system memories or registers or other such information storage, transmission or display devices.

Finally, the structure, algorithms, and/or interfaces presented herein are not inherently tied to any particular computer or other apparatus. Various general-purpose systems may be used with programs in accordance with the teachings herein, or it may prove convenient to construct more specialized apparatus to perform the method blocks. The structure for a variety of these systems will appear from the description above. In addition, the specification is not described with reference to any particular programming language. It will be appreciated that a variety of programming languages may be used to implement the teachings of the specification as described herein.

Accordingly, the disclosure is intended to be illustrative, but not limiting.

What is claimed is:

1. A computer implemented method for using tokens and associated smart contracts on a blockchain to automatically manage software licenses, the method comprising:
    responsive to a user attempting to license a piece of software, establishing a connection between a wallet of the user and the piece of software, and automatically receiving, by the piece of software to be licensed executing on a computer system, blockchain transaction credentials from the wallet of the user;
    the piece of software to be licensed automatically triggering execution of a smart contract, the smart contract being associated with a blockchain token-based license for the piece software, by a computer system;
    the executing smart contract automatically performing a license verification for the user using the provided blockchain transaction credentials from the wallet of the user, without using a license server;
    the automatically performed license verification determining, by the executing smart contract, whether the user has a valid blockchain token-based license for the piece software, without using a license server; and
    responsive to results of the verification, the executing smart contract automatically enforcing the terms of the blockchain token-based license for the piece software, without using a license server.

2. The method of claim 1 wherein performing a license verification for the user further comprises:
    determining that the user does not have a blockchain token-based license for the piece of software, as indicated by the user's wallet.

3. The method of claim 2 wherein automatically enforcing terms of the smart contract further comprises:
    executing a transaction on the blockchain to purchase a blockchain token-based license for the piece of software for the user, using the provided blockchain transaction credentials from the user's wallet.

4. The method of claim 1 wherein performing a license verification for the user further comprises:
    determining that the user does have a blockchain token-based license for the piece of software, as indicated by the user's wallet; and
    determining that the license is valid for the access of the piece of software being attempted by the user.

5. The method of claim 4 wherein automatically enforcing terms of the smart contract further comprises:
    allowing the access of the piece of software being attempted by the user to proceed.

6. The method of claim 1 wherein performing a license verification for the user further comprises:
    determining that the user does have a blockchain token-based license for the piece of software, as indicated by the user's wallet; and
    determining that the license is not valid for the access of the piece of software being attempted by the user.

7. The method of claim 6 wherein automatically enforcing terms of the smart contract further comprises:
    preventing the access of the piece of software being attempted by the user to proceed.

8. The method of claim 1 wherein automatically enforcing terms of the smart contract further comprises:
    allowing the user to transfer, resell and/or swap the license for the piece of software.

9. The method of claim 1 wherein the blockchain token-based license of the piece of software further comprises:
    an NFT license with an associated smart contract.

10. The method of claim 1 wherein the transaction credentials further comprise:
    an address of the user's wallet, a public key of the user, and a cryptographic signature generated using a private key of the user.

11. A computer system for using tokens and associated smart contracts on a blockchain to automatically manage software licenses, the computer system comprising:
    at least one processor;
    a network interface, communicatively coupled to the at least one processor and to an external data communication network;
    at least one memory, communicatively coupled to the at least one processor;
    a piece of software residing in memory, the piece of software, when executed by the at least one processor, causes the at least one processor to perform operations of:
        responsive to a user attempting to license the piece of software, establishing a connection between a wallet of the user and the piece of software, and automatically receiving, by the piece of software, blockchain transaction credentials from the wallet of the user;
        automatically triggering execution of a smart contract using the automatically provided blockchain transaction credentials the smart contract associated with a blockchain token-based license for the piece software;
        automatically performing, using the executing smart contract, a license verification for the user using the provided blockchain transaction credentials from the wallet of the user, without using a license server;

the automatically performed license verification determining, using the executing smart contract, whether the user has a valid blockchain token-based license for the piece software, without using a license server; and responsive to results of the verification, automatically enforcing, using the executing smart contract, the terms of the blockchain token-based license for the piece software, without using a license server.

12. At least one non-transitory computer-readable storage medium for using tokens and associated smart contracts on a blockchain to automatically manage software licenses, the at least one non-transitory computer-readable storage medium storing computer executable instructions that, when loaded into computer memory and executed by at least one processor of a computing device, cause the computing device to perform the following steps responsive to a user attempting to license a piece of software, establishing a connection between a wallet of the user and the piece of software, and automatically receiving, by executing the piece of software to be licensed, blockchain transaction credentials from the wallet of the user;

the piece of software to be licensed automatically triggering execution of a smart contract, the smart contract being associated with a blockchain token-based license for the piece software, by a computer system;

the executing smart contract automatically performing a license verification for the user using the provided blockchain transaction credentials from the wallet of the user, without using a license server;

the automatically performed license verification determining, by the executing smart contract, whether the user has a valid blockchain token-based license for the piece software, without using a license server; and responsive to results of the verification, the executing smart contract automatically enforcing the terms of the blockchain token-based license for the piece software, without using a license server.

13. The at least one non-transitory computer-readable storage medium of claim 12 wherein performing a license verification for the user further comprises:

determining that the user does not have a blockchain token-based license for the piece of software, as indicated by the user's wallet.

14. The at least one non-transitory computer-readable storage medium of claim 13 wherein automatically enforcing terms of the smart contract further comprises:

executing a transaction on the blockchain to purchase a blockchain token-based license for the piece of software for the user, using the provided blockchain transaction credentials from the user's wallet.

15. The at least one non-transitory computer-readable storage medium of claim 12 wherein performing a license verification for the user further comprises:

determining that the user does have a blockchain token-based license for the piece of software, as indicated by the user's wallet; and determining that the license is valid for the access of the piece of software being attempted by the user.

16. The at least one non-transitory computer-readable storage medium of claim 15 wherein automatically enforcing terms of the smart contract further comprises:

allowing the access of the piece of software being attempted by the user to proceed.

17. The at least one non-transitory computer-readable storage medium of claim 12 wherein performing a license verification for the user further comprises:

determining that the user does have a blockchain token-based license for the piece of software, as indicated by the user's wallet; and determining that the license is not valid for the access of the piece of software being attempted by the user.

18. The at least one non-transitory computer-readable storage medium of claim 17 wherein automatically enforcing terms of the smart contract further comprises:

preventing the access of the piece of software being attempted by the user to proceed.

19. The at least one non-transitory computer-readable storage medium of claim 12 wherein automatically enforcing terms of the smart contract further comprises:

allowing the user to transfer, resell and/or swap the license for the piece of software.

20. The at least one non-transitory computer-readable storage medium of claim 12 wherein the blockchain token-based license of the piece of software further comprises:

an NFT license with an associated smart contract.

* * * * *